US009581340B2

(12) United States Patent
Rutherford

(10) Patent No.: US 9,581,340 B2
(45) Date of Patent: Feb. 28, 2017

(54) DOMESTIC HOT WATER DELIVERY SYSTEM

(71) Applicant: BillyBobCo.com Inc., Mississauga (CA)

(72) Inventor: Robert G. Rutherford, Mississauga (CA)

(73) Assignee: BillyBob Corporation, Mississauga, Ontario (CA)

( * ) Notice: Subject to any disclaimer, the term of this patent is extended or adjusted under 35 U.S.C. 154(b) by 433 days.

(21) Appl. No.: 14/081,243

(22) Filed: Nov. 15, 2013

(65) Prior Publication Data

US 2014/0137591 A1    May 22, 2014

Related U.S. Application Data

(60) Provisional application No. 61/727,186, filed on Nov. 16, 2012.

(51) Int. Cl.

| | |
|---|---|
| *F25B 27/00* | (2006.01) |
| *F24D 15/04* | (2006.01) |
| *F24D 3/00* | (2006.01) |
| *F24F 13/30* | (2006.01) |
| *F24F 3/06* | (2006.01) |
| *F24F 5/00* | (2006.01) |

(Continued)

(52) U.S. Cl.
CPC ............... *F24D 15/04* (2013.01); *F24D 3/00* (2013.01); *F24D 3/08* (2013.01); *F24D 11/0214* (2013.01); *F24F 3/06* (2013.01); *F24F 5/0096* (2013.01); *F24F 13/30* (2013.01); *F24D 2200/123* (2013.01); *Y02B 30/126* (2013.01); *Y10T 137/6416* (2015.04)

(58) Field of Classification Search
CPC ... F24D 15/04; F24D 3/00; F24D 3/08; F24D 11/0214; F24D 3/06; F24D 5/0096; F24D 2200/123; F24D 3/105; F24D 17/02; F24D 19/1054; Y02B 30/126; F24H 1/52; F24H 1/50; F24H 4/00; F24H 4/02
See application file for complete search history.

(56) References Cited

U.S. PATENT DOCUMENTS

| | | |
|---|---|---|
| 4,598,557 A | 7/1986 | Robinson et al. |
| 4,693,089 A | 9/1987 | Bourne et al. |

(Continued)

*Primary Examiner* — Elizabeth Martin
(74) *Attorney, Agent, or Firm* — Downs Rachlin Martin PLLC

(57) ABSTRACT

A preheat tank to which a heat exchanger is operatively coupled receives water from a distribution subsystem. A water distribution subsystem and tempered fluid distribution subsystem provide domestic water and tempered fluid, respectively, to a plurality of spaces. Air handlers transfer heat between the tempered fluid and the spaces for heating and cooling. A controller coupled to the tempered fluid subsystem, the heat exchanger and a refrigerator has: (i) a first mode, wherein the fluid is routed through the heat exchanger, to pass heat to the preheat tank; and (ii) a second mode, wherein the fluid is routed through an evaporator of the refrigerator, to pass heat to the refrigerant. A storage tank is coupled to the preheat tank to receive water therefrom and is coupled to the condenser of the refrigerator such that heat rejected by the condenser is passed to the contents of the storage tank.

20 Claims, 7 Drawing Sheets

(51) Int. Cl.
*F24D 3/08* (2006.01)
*F24D 11/02* (2006.01)

(56) References Cited

U.S. PATENT DOCUMENTS

| | | | |
|---|---|---|---|
| 4,796,437 A * | 1/1989 | James | F24H 4/04 |
| | | | 62/238.6 |
| 4,809,516 A | 3/1989 | Jones | |
| 5,054,542 A | 10/1991 | Young et al. | |
| 5,305,614 A | 4/1994 | Gilles | |
| 5,806,331 A | 9/1998 | Brown | |
| 5,984,198 A | 11/1999 | Bennett et al. | |
| 6,347,527 B1 | 2/2002 | Bailey et al. | |
| 6,666,040 B1 | 12/2003 | Groenewold et al. | |
| 7,575,001 B2 | 8/2009 | Kaiser | |
| 7,716,943 B2 | 5/2010 | Seefeldt | |
| 2010/0230071 A1 | 9/2010 | Slater | |
| 2011/0041536 A1 | 2/2011 | O'Brien et al. | |
| 2013/0104574 A1* | 5/2013 | Dempsey | F25B 29/003 |
| | | | 62/79 |
| 2013/0186122 A1* | 7/2013 | Hamilton | F25B 29/003 |
| | | | 62/238.6 |
| 2014/0202449 A1* | 7/2014 | Snyder | F24F 5/0035 |
| | | | 126/714 |

* cited by examiner

DOMESTIC HOT WATER DELIVERY SYSTEM

CROSS-REFERENCE TO RELATED APPLICATIONS

This application claims the benefit of U.S. Provisional Application No. 61/727,186, filed Nov. 16, 2012, which is incorporated by reference herein in its entirety.

FIELD OF THE INVENTION

The invention relates to the field of domestic hot water supply.

BACKGROUND

Most high rise residential buildings are provided with distribution systems for two fluids:
cold water
tempered fluids
The tempered fluids are used by in-suite handling units for space heating and cooling. The most popular tempered fluid systems are: hybrid heat pump; water source heat pump; two pipe fan coil; and four pipe fan coil.
Domestic hot water is typically provided via one of:
Centralized hot water
in-suite electric tanks
in-suite gas-fired tanks
Each of the domestic hot water solutions has advantages and disadvantages. The centralized hot water system is relatively efficient, but requires additional piping throughout the building and requires individual flow meters, if cost is not to be shared uniformly. In-suite electric hot water tanks avoid the need for additional piping and metering, as the electricity would normally be drawn from the suite service that is typically monitored, but electric heating of water is relatively expensive. In-suite gas-fired water tanks provide relatively inexpensive hot water, but require gas piping and venting throughout the building, as well as flow meters, all of which would normally not otherwise be required.

SUMMARY OF THE INVENTION

Forming one aspect of the invention is a system for providing domestic water, heated domestic water and space heating and cooling to a plurality of spaces.

This system comprises a domestic water distribution subsystem for providing domestic water to said plurality of spaces, a tempered fluid distribution subsystem for tempering a fluid and providing same to said plurality of spaces, air handling units adapted to transfer heat between the fluid and the plurality of spaces to provide for said space heating and cooling and a plurality of arrangements for providing heated domestic water.

Each arrangement includes:
a preheat tank coupled to the domestic water distribution subsystem for receiving domestic water therefrom;
a heat exchanger coupled to the preheat tank in heat exchanging relation;
a condenser, an evaporator, a refrigerant circuit including refrigerant, a compressor and an expansion valve, all coupled together to define a vapour compression refrigeration arrangement wherein heat is accepted in the evaporator in use and rejected in the condenser in use;
a control mechanism coupled to the tempered fluid distribution subsystem, the heat exchanger and the refrigeration arrangement and having: (i) a first operating mode, wherein the fluid is routed through the heat exchanger, to pass heat to the contents of the preheat tank; and (ii) a second operating mode, wherein the fluid is routed through the evaporator and the refrigeration arrangement is active, to pass heat to the refrigerant; and
a water storage tank coupled to the preheat tank to receive water therefrom and coupled to the condenser in heat exchanging relation such that heat rejected by the condenser is passed to the contents of the hot water storage tank.

According to another aspect of the invention, in this system, the control mechanism can have a third operating mode, wherein heat is passed neither to the heat exchanger nor the evaporator.

According to another aspect of the invention, in this system, the tempered fluid distribution subsystem can have a supply and a return and be selected from hybrid heat pump system, water source heat pump system and two pipe fan coil system; and the control mechanism can have a fourth operating mode, wherein the refrigeration arrangement is active and the fluid is routed through the heat exchanger and then through the evaporator to pass heat to the contents of the preheat tank and then to the refrigerant.

According to another aspect of the invention, in this system, in use:
the fluid can flow through the heat exchanger when: the temperature of the fluid upstream of the heat exchanger is materially higher than the temperature of the preheat tank and the temperature of the preheat tank is materially below the hot water tank set point temperature;
the fluid can not flow through the heat exchanger when the temperature of the fluid upstream of the heat exchanger is below the temperature of the preheat tank;
the refrigeration arrangement can be inactive when the temperature of the fluid upstream of the evaporator is below the minimum safe operating temperature of the tempered fluid subsystem;
the refrigeration arrangement can be inactive when the temperature of the hot water tank is materially above the hot water set point temperature; and
the refrigeration arrangement can be active when: the temperature of the hot water tank is materially below the set point temperature of the hot water tank; the temperature of the fluid upstream and downstream of the evaporator is materially above the minimum safe operating temperature of the tempered fluid subsystem; the temperature of the hot water tank is falling; and the temperature of the preheat tank is falling.

According to another aspect of the invention, in this system:
the refrigeration arrangement can be inactive when the temperature of the preheat tank is increasing and the temperature of the fluid downstream of the heat exchanger is materially above the set point temperature of the hot water tank; and
the refrigeration arrangement can be active when the temperature of the hot water tank is materially below the set point temperature of the hot water tank, the temperature of the fluid upstream and downstream of the evaporator is materially above the minimum safe operating temperature of the tempered fluid subsystem, the temperature of the preheat tank is stable and the temperature in the hot water tank is falling.

According to another aspect of the invention, in this system, the tempered fluid system can be a hybrid heat pump system and the fluid can be provided in use to each of the plurality of spaces at a temperature which ranges from 75 F in summer to 130 F in winter.

According to another aspect of the invention, in this system, the fluid can be provided in use to each of the plurality of spaces at a temperature which ranges from about 85 F in summer to about 120 F in winter.

According to another aspect of the invention, in this system, the tempered fluid system can be a water source heat pump and the fluid can be provided in use to each of the plurality of spaces at a temperature that ranges between 105 F in summer and 55 F in winter, or, more specifically, at a temperature that ranges between about 90 F in summer and about 60 F in winter.

According to another aspect of the invention, in this system, the tempered fluid subsystem can be a two pipe fan coil system; in summer, the fluid can be provided in use to each of the plurality of spaces at a temperature between 40 F and 60 F; and in winter, the fluid can be provided in use to each of the plurality of spaces at a temperature between 100 F and 180 F.

According to another aspect of the invention, in this system: in summer, the fluid can be provided in use to each of the plurality of spaces at a temperature of about 45 F; and in winter, the fluid can be provided in use to each of the plurality of spaces at a temperature of about 130 F.

According to another aspect of the invention, in this system:
the control mechanism can be defined by: a fluid circuit coupling the tempered water subsystem supply to the tempered water subsystem return and in which the evaporator is interposed; a control valve interposed in the fluid circuit upstream of the evaporator; a three way valve interposed in the fluid circuit upstream of the control valve; and a shunt fluid circuit providing a parallel path from the tempered water subsystem supply to the three way valve and in which the heat exchanger is interposed
the first operating mode can be defined by a position of the 3-way valve that provides for flow through the heat exchanger, a position of the control valve that provides for flow through the evaporator and an inactive vapour compression refrigeration arrangement;
the second operating mode can be defined by a position of the 3-way valve that provides for flow which bypasses the heat exchanger, a position of the control valve that provides for flow through the evaporator and an active vapour compression refrigeration arrangement;
the third operating mode can be defined by a position of the control valve that arrests flow and an inactive vapour compression refrigeration arrangement; and
the fourth operating mode can be defined by a position of the 3-way valve that provides for flow through the heat exchanger, a position of the control valve that provides for flow through the evaporator and an active vapour compression refrigeration arrangement.

According to another aspect of the invention, in this system:
the tempered fluid subsystem can be a four pipe fan coil system including a chilled water supply, a hot water supply, a chilled water return and a hot water return;
the tempered fluid distribution system can provide to each of the plurality of spaces: (i) hot water, at a temperature that ranges from 160 F in winter to 80 F in summer; and (ii) at least in summer, chilled water, at a temperature in the range of 40-60 F; and the control mechanism can be coupled to the tempered fluid distribution subsystem, the heat exchanger and the refrigeration arrangement such that, in the first operating mode, the hot water is routed through the heat exchanger, to pass heat to the contents of the preheat tank; and in the second operating mode, the chilled fluid is routed through the evaporator and the refrigeration arrangement is active, to pass heat to the refrigerant.

According to another aspect of the invention, in this system, the tempered fluid distribution system can provide to each of the plurality of spaces: (i) hot water, at a temperature that ranges from 130 F in winter to 120 F in summer; and (ii) at least in summer, chilled water, at a temperature of about 45 F.

According to another aspect of the invention, in this system,
the hot water can flow through the heat exchanger when the temperature of the hot water upstream of the heat exchanger is materially higher than the temperature of the preheat tank and the temperature of the preheat tank is materially below the hot water tank set point temperature;
the hot water can not flow through the heat exchanger when the temperature of the hot water upstream of the heat exchanger is below the temperature of the preheat tank;
the refrigeration arrangement can be inactive when the temperature of the hot water tank is materially above the hot water set point temperature;
the refrigeration arrangement can be active when the temperature of the hot water tank is materially below the set point temperature of the hot water tank, the temperature of the hot water tank is falling and the temperature of the preheat tank is falling;
the refrigeration arrangement can be inactive when the temperature of the preheat tank is increasing and the temperature of the hot water downstream of the heat exchanger is materially above the set point temperature of the hot water tank; and
the refrigeration arrangement can be active when the temperature of the hot water tank is materially below the set point temperature of the hot water tank, the temperature of the preheat tank is stable and the temperature in the hot water tank is falling.

According to another aspect of the invention, in this system:
the control mechanism is defined by: (i) a first fluid circuit in which the heat exchanger is interposed which couples the hot water supply to the hot water return; (ii) a second fluid circuit in which the evaporator is interposed which couples the chilled water supply to the chilled water return; (iii) a first control valve interposed in the first fluid circuit; and (iv) a second control valve interposed in the second fluid circuit;
the first operating mode is defined by a position of the first control valve that provides for flow through the heat exchanger, a position of the second control valve that arrest flow through the evaporator and an inactive vapor compression refrigeration arrangement;
the second operating mode is defined by a position of the first control valve that arrests flow through the heat exchanger, a position of the second control valve that provides for flow through the evaporator and an active vapor compression refrigeration arrangement; and
the third operating mode is defined by a position of the first control valve that arrests flow through the heat exchanger, a position of the second control valve that arrest flow through the evaporator and an inactive vapor compression refrigeration arrangement.

Forming yet another aspect of the invention is a water heater arrangement for use with a domestic water distribution subsystem and a tempered fluid distribution subsystem. The tempered fluid distribution subsystem is of the type adapted to temper a fluid and provide same to a plurality of spaces, having a supply and a return and being selected from hybrid heat pump system, water source heat pump system and two pipe fan coil system.

This arrangement comprises:
- a preheat tank coupled to the domestic water distribution subsystem for receiving water therefrom;
- a heat exchanger coupled to the preheat tank in heat exchanging relation;
- a condenser, an evaporator, a refrigerant circuit including refrigerant, a compressor and an expansion valve, all coupled together to define a vapour compression refrigeration arrangement wherein heat is accepted in the evaporator in use and rejected in the condenser in use;
- a control mechanism coupled to the tempered fluid distribution subsystem, the heat exchanger and the refrigeration arrangement and having: (i) a first operating mode, wherein the fluid is routed through the heat exchanger, to pass heat to the contents of the preheat tank; (ii) a second operating mode, wherein the fluid is routed through the evaporator and the refrigeration arrangement is active, to pass heat to the refrigerant; (iii) a third operating mode, wherein heat from the fluid is passed neither through the heat exchanger nor the evaporator; and (iv) a fourth operating mode, wherein the fluid is routed through the heat exchanger and then through the evaporator to pass heat to the contents of the preheat tank and then to the refrigerant; and
- a water storage tank coupled to the preheat tank to receive water therefrom and coupled to the condenser in heat exchanging relation such that heat rejected by the condenser is passed to the contents of the hot water storage tank.

According to another aspect of the invention, in this arrangement:
- the control mechanism can be defined by: (i) a fluid circuit coupling the tempered water subsystem supply to the tempered water subsystem return and in which the evaporator is interposed; (ii) a control valve interposed in the fluid circuit upstream of the evaporator; (iii) a three way valve interposed in the fluid circuit upstream of the control valve; and (iv) a shunt fluid circuit providing a parallel path from the tempered water subsystem supply to the three way valve and in which the heat exchanger is interposed; and
- the first operating mode can be defined by a position of the 3-way valve that provides for flow through the heat exchanger, a position of the control valve that provides for flow through the evaporator and an inactive vapor compression refrigeration arrangement;
- the second operating mode can be defined by a position of the 3-way valve that provides for flow which bypasses the heat exchanger, a position of the control valve that provides for flow through the evaporator and an active vapor compression refrigeration arrangement;
- the third operating mode can be defined by a position of the control valve that arrests flow and an inactive vapor compression refrigeration arrangement; and
- the fourth operating mode can be defined by a position of the 3-way valve that provides for flow through the heat exchanger, a position of the control valve that provides for flow through the evaporator and an active vapor compression refrigeration arrangement.

A water heater arrangement for use with a domestic water distribution subsystem and with a tempered fluid distribution subsystem forms another aspect of the invention. This tempered fluid subsystem is a four pipe fan coil system including a chilled water supply, a hot water supply, a chilled water return and a hot water return.

This arrangement comprises:
- a preheat tank coupled to the domestic water distribution subsystem for receiving water therefrom;
- a heat exchanger coupled to the preheat tank in heat exchanging relation;
- a condenser, an evaporator, a refrigerant circuit including refrigerant, a compressor and an expansion valve, all coupled together to define a vapour compression refrigeration arrangement wherein heat is accepted in the evaporator and rejected in the condenser;
- a control mechanism coupled to the tempered fluid distribution subsystem, the heat exchanger and the refrigeration arrangement and having: (i) a first operating mode, wherein the hot water supply is routed through the heat exchanger, to pass heat to the contents of the preheat tank; and (ii) a second operating mode, wherein the chilled water supply is routed through the evaporator and the refrigeration arrangement is active, to pass heat to the refrigerant; and
- a water storage tank coupled to the preheat tank to receive water therefrom and coupled to the condenser in heat exchanging relation such that heat rejected by the condenser is passed to the contents of the hot water storage tank.

According to another aspect of the invention, in this arrangement:
- the control mechanism can also have a third operating mode, wherein the hot water supply bypasses the heat exchanger and the chilled water supply bypasses the evaporator; and
- the control mechanism can be defined by: a first fluid circuit in which the heat exchanger is interposed which couples the hot water supply to the hot water return; a second fluid circuit in which the evaporator is interposed which couples the chilled water supply to the chilled water return; a first control valve interposed in the first fluid circuit; and a second control valve interposed in the second fluid circuit, and:
- the first operating mode can be defined by a position of the first control valve that provides for flow through the heat exchanger, a position of the second control valve that arrest flow through the evaporator and an inactive vapor compression refrigeration arrangement;
- the second operating mode can be defined by a position of the first control valve that arrests flow through the heat exchanger, a position of the second control valve that provides for flow through the evaporator and an active vapor compression refrigeration arrangement; and
- the third operating mode can be defined by a position of the first control valve that arrests flow through the heat exchanger, a position of the second control valve that arrest flow through the evaporator and an inactive vapor compression refrigeration arrangement.

Other advantages, features and benefits of the present invention, will become apparent upon a review of the following detailed description and drawings, the latter being briefly described hereinafter.

DETAILED DESCRIPTION

Figure 1:
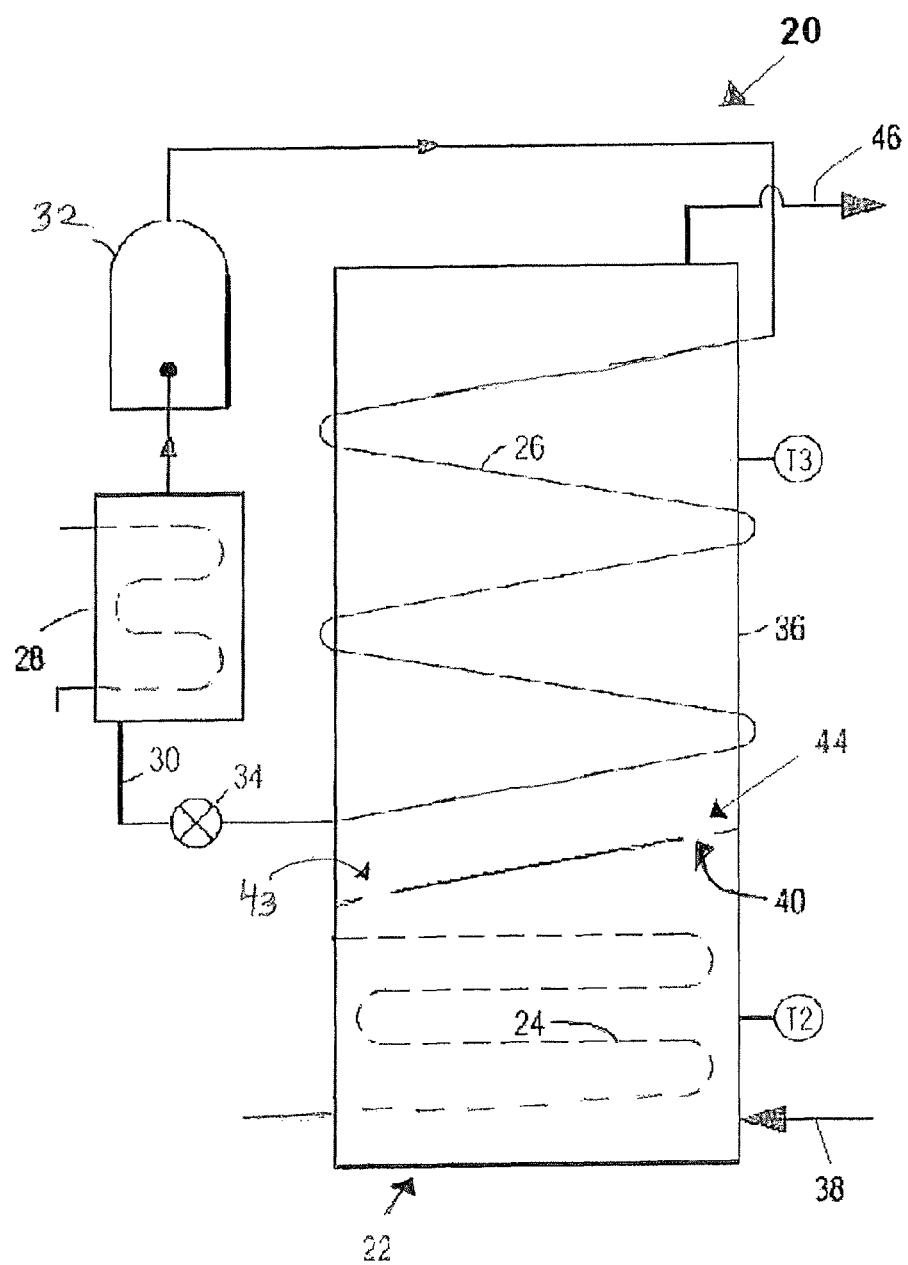
FIG. 1 is a schematic view of the main components of an arrangement for providing heated domestic water according to an exemplary embodiment of the invention.

FIG. 1 shows, in schematic form, the main components of an arrangement 20 for providing heated domestic water according to an exemplary embodiment of the present invention.

Herein, it will be seen that the main components of the arrangement 20 include: a preheat tank 22, a heat exchanger 24, a condenser 26, an evaporator 28, a refrigerant circuit 30 including refrigerant, a compressor 32, an expansion valve 34 and a water storage tank 36.

The preheat tank 22 has an inlet 38 and an outlet 40.

The heat exchanger 24 is coupled to the preheat tank 22 in heat exchanging relation and is defined by a coil disposed interiorly of the preheat tank 22.

Condenser 26, evaporator 28, refrigerant circuit 30 including refrigerant, compressor 32 and expansion valve 34 are all coupled together to define a vapour compression refrigeration arrangement 42 wherein heat is accepted in the evaporator 28 and rejected in the condenser 26. The condenser 26 will be seen in this embodiment to be a coil.

The water storage tank 36
- is disposed in heat exchanging relation to, namely, interiorly of, the condenser coil 26 such that heat rejected by the condenser 26 is passed to the contents of the hot water storage tank 36;
- has an inlet 44 coupled to the outlet 40 of the preheat tank; and
- has an outlet 46 from which heated water can be withdrawn in use.

In the structure shown, the water storage tank 36 and the preheat tank 22 are defined by portions of larger tank, with the inlet 44 of the water storage tank 36 and the outlet 40 of the preheat tank being defined by an aperture in a sloping dividing wall. A further aperture 43 is also defined in the sloped divider and allows, inter alia, for relatively cooler water in the water storage tank 36 to displace relatively warmer water in the preheat tank 22, if the situation arises.

Figure 7:
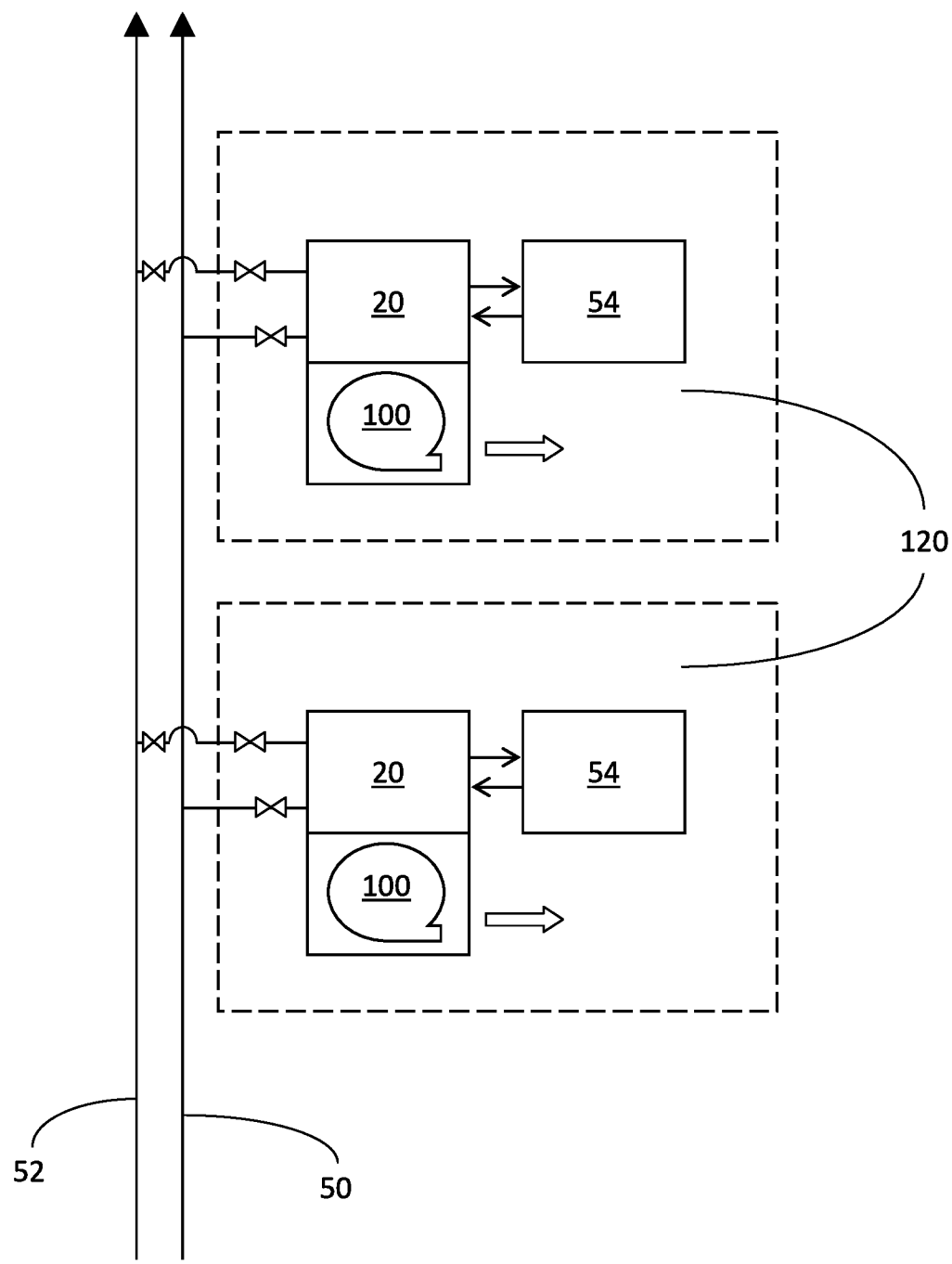
FIG. 7 shows a schematic view of a plurality of arrangements according to an exemplary embodiment of the invention in use with the air handling units and the domestic water distribution subsystem.

As will become apparent upon further consideration, the arrangement is advantageously used as part of a system for providing domestic water, heated domestic water and space heating and cooling to a plurality of spaces 120, such as high-rise residential buildings, the system being of the type including a domestic water distribution subsystem for providing domestic water to said plurality of spaces; a tempered fluid distribution subsystem for providing tempered fluid to said plurality of spaces; and air handling units 100 adapted to transfer heat between the tempered fluid and the plurality of spaces to provide for said space heating and cooling. When used as part of such a system, an arrangement as shown in elemental form in FIGS. 1 and 7 is provided for each space to be provided with heated domestic water, and substitutes for a conventional water heater, as described hereinafter.

An exemplary use of the arrangement is in the context of a high-rise residential building having a tempered fluid distribution subsystem including a single supply and a single return. Tempered fluid distribution subsystems of this type include hybrid heat pump systems, water source heat pump systems and two pipe fan coil system, and reference is now made to FIG. 2 which shows an arrangement according to an exemplary embodiment of the invention and including the elements of FIG. 1 as used in a high-rise residential building having a tempered fluid system of this type.

Figure 3:
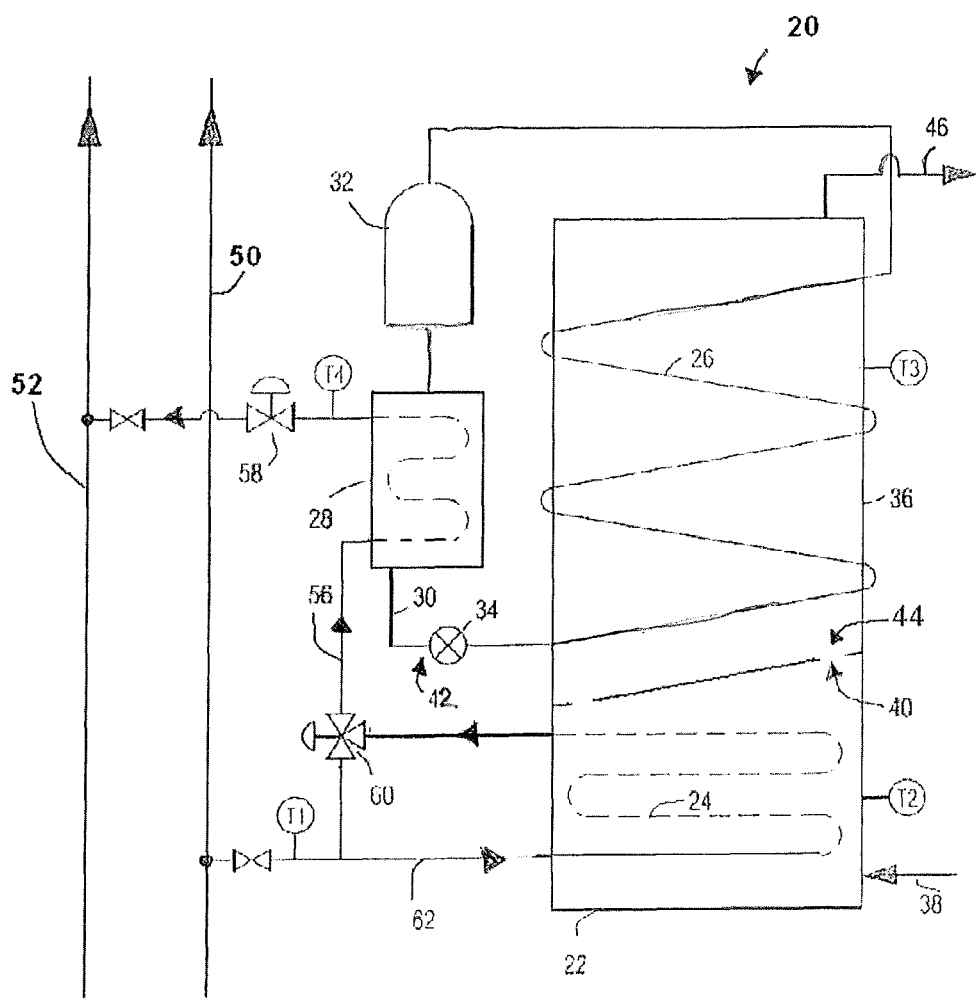
FIG. 3 is a view similar to FIG. 2, showing a first operating mode.

Herein will be seen:
- the tempered water subsystem supply 50
- the tempered water subsystem return 52
- the preheat tank 22, heat exchanger 24, condenser 26, evaporator 28, refrigerant circuit 30 including refrigerant, compressor 32, expansion valve 34 and water storage tank 36, as previously described, the inlet 38 of the preheat tank 22 now being coupled to a domestic water distribution subsystem 54 for receiving domestic water therefrom.
- a fluid circuit 56 coupling the tempered water subsystem supply 50 to the tempered water subsystem return 52 and in which the evaporator 28 is interposed; a control valve 58 interposed in the fluid circuit 56 upstream of the evaporator 28; a three way valve 60 interposed in the fluid circuit 56 upstream of the control valve 60; and a shunt fluid circuit 62 providing a parallel path from the tempered water subsystem supply 50 to the three way valve 60 and in which the heat exchanger 24 is interposed, all collectively defining a control mechanism that has four operating modes First Operating Mode—Passive Reclaim The first operating mode is defined by a position of the 3-way valve 60 that provides for flow through the heat exchanger 24, a position of the control valve 58 that provides for flow through the evaporator 28 and an inactive vapour compression refrigeration arrangement 42, all as shown in FIG. 3. In the first operating mode, the tempered fluid is routed through the heat exchanger 24, to pass heat to the contents of the preheat tank 22.

Second Operating Mode—Active Reclaim

Figure 4:
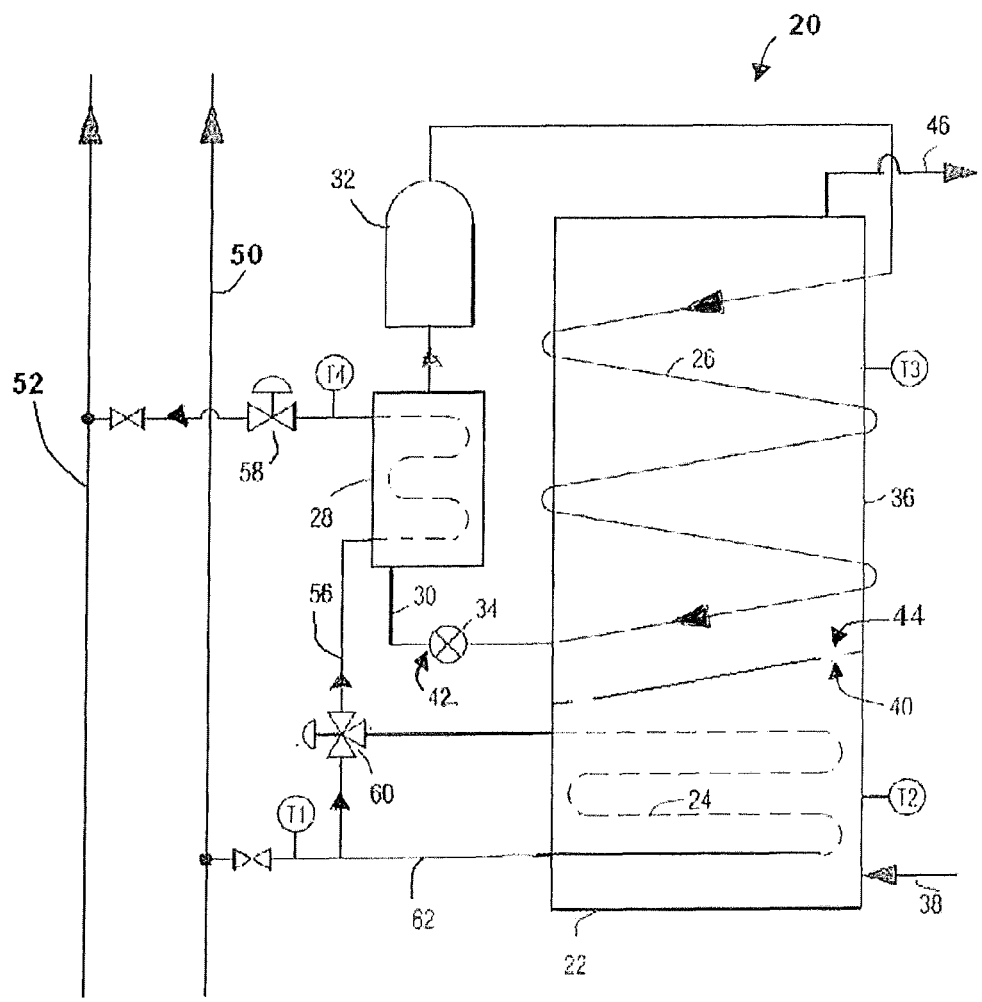
FIG. 4 is a view similar to FIG. 2, showing a second operating mode.

The second operating mode is defined by a position of the 3-way valve 60 that provides for flow which bypasses the heat exchanger 24, a position of the control valve 58 that provides for flow through the evaporator 28 and an active vapour compression refrigeration arrangement 42, all as shown in FIG. 4. In the second operating mode, the tempered fluid is routed through the evaporator 28 and the refrigeration arrangement is active, such that heat is passed to the refrigerant.

Third Operating Mode—Inactive

Figure 2:
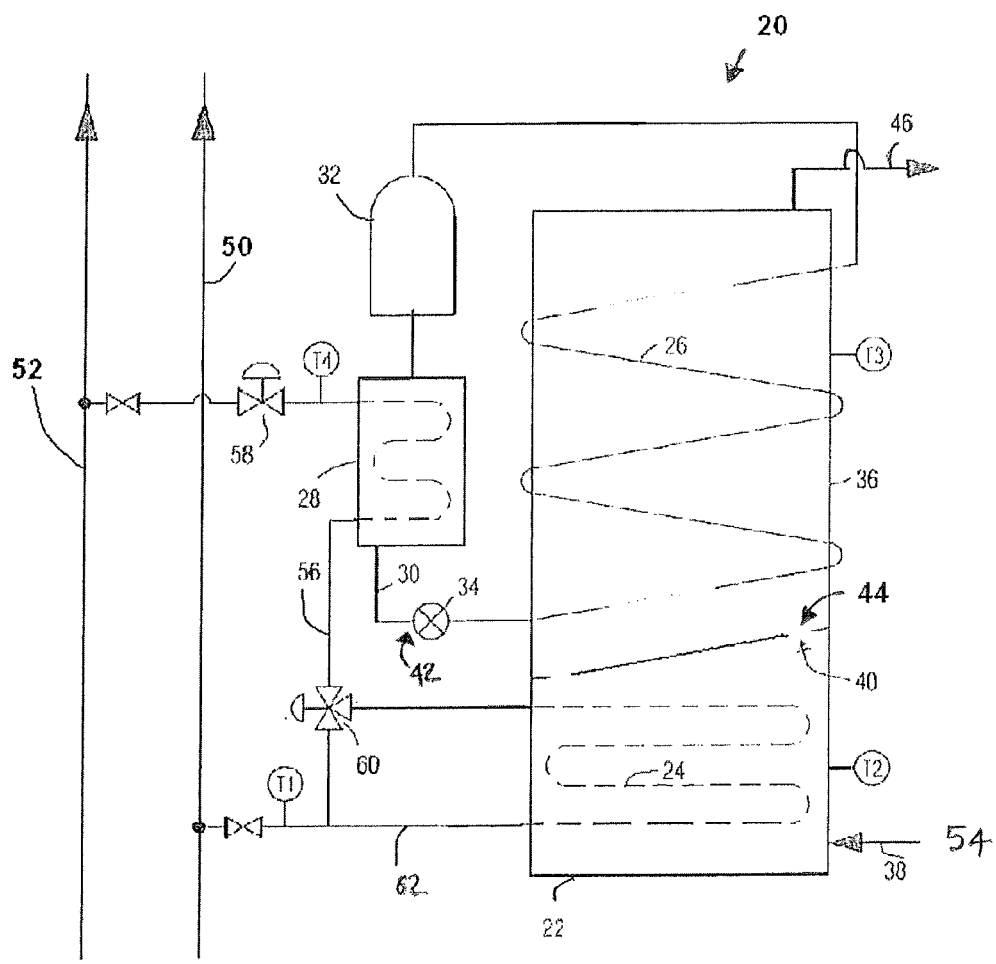
FIG. 2 shows a schematic view of an arrangement according to an exemplary embodiment of the invention coupled for use with a two pipe tempered fluid system of the type used for space heating.

The third operating mode, as shown in FIG. 2, is defined by a position of the control valve 58 that arrests flow and an inactive vapour compression refrigeration arrangement 42. In this mode, heat is passed neither to the heat exchanger nor the evaporator.

Fourth Operating Mode—Passive and Active Reclaim

Figure 5:
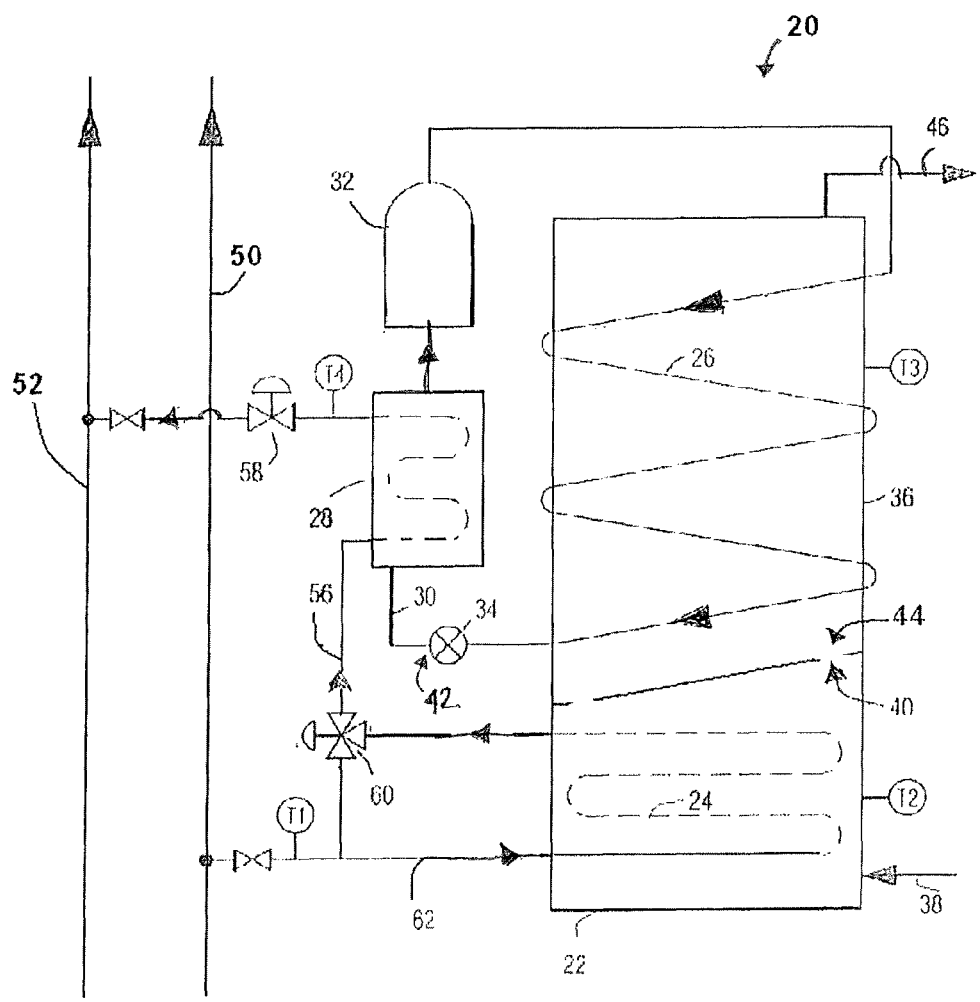
FIG. 5 is a view similar to FIG. 3, showing a third operating mode.

The fourth operating mode is defined by a position of the 3-way valve 60 that provides for flow through the heat exchanger 24, a position of the control valve 58 that provides for flow through the evaporator 28 and an active vapour compression refrigeration arrangement 42. In the fourth operating mode, as shown in FIG. 5, the tempered fluid is routed through the heat exchanger 24 and then through the evaporator to pass heat to the contents of the preheat tank 22 and then to the refrigerant.

Mode Selection

In the context of hybrid heat pump systems, water source heat pump systems and two pipe fan coil system, the controller is adapted to switch between modes in a generally similar fashion:
- the fluid flows through the heat exchanger when: the temperature of the fluid upstream of the heat exchanger is materially higher than the temperature of the preheat tank and the temperature of the preheat tank is materially below the hot water tank set point temperature;
- the fluid does not flow through the heat exchanger when the temperature of the fluid upstream of the heat exchanger is below the temperature of the preheat tank;
- the refrigeration arrangement is inactive when the temperature of the fluid upstream of the evaporator is below the minimum safe operating temperature of the tempered fluid subsystem;
- the refrigeration arrangement is inactive when the temperature of the hot water tank is materially above the hot water set point temperature;
- the refrigeration arrangement is active when: the temperature of the hot water tank is materially below the set point temperature of the hot water tank; the temperature of the fluid upstream and downstream of the evaporator is materially above the minimum safe operating temperature of the tempered fluid subsystem; the temperature of the hot water tank is falling; and the temperature of the preheat tank is falling.
- the refrigeration arrangement is inactive when the temperature of the preheat tank is increasing and the temperature of the fluid downstream of the heat exchanger is materially above the set point temperature of the hot water tank; and
- the refrigeration arrangement is active when the temperature of the hot water tank is materially below the set point temperature of the hot water tank, the temperature of the fluid upstream and downstream of the evaporator is materially above the minimum safe operating temperature of the tempered fluid subsystem, the temperature of the preheat tank is stable and the temperature in the hot water tank is falling.

Numerous references are made above [and in subsequent passages] to "material" temperature differences. In this regard, it will be appreciated that, to avoid excessive cycling, it will be necessary to set, for example, "rise" and "drop" thermostatic differentials, i.e., when the tempered fluid is warmer than the preheat tank, the fluid will be passed through the heat exchanger until the preheat tank is quite a bit warmer than the desired set point, and then will not be cycled through again until the temperature in the preheat tank has fallen below the set point. Similarly, in the context of a ΔT for heat exchange purposes, it will be appreciated that when ΔT becomes relatively small, heat exchange will slow down significantly, to the point that the cost of pumping fluid through the heat exchanger may well overwhelm the amount of free heat obtained. Persons of ordinary skill will readily understand (i) that the concept of "material" differences as described herein addresses both the problems of unnecessary thermostatic cycling and diminishing heat exchange returns, and (ii) the manner in which computer controls can be implemented to achieve these goals. Accordingly, further description of this concept and the manner in which it is implemented to achieve the goals of the present invention are neither required nor disclosed.

The outcome of the mode selection depends upon the nature of the tempered fluid distribution system in use and the thermodynamic capacity of the hot water arrangement.

Hybrid Heat Pump System

In hybrid heat pump systems, the tempered fluid supply is available year round with a temperature [T1 in FIGS. 2-5] that ranges from about 75 in summer and 130 F in winter. In this application, an operating regime that has significant advantage in climates such as that in Southern Ontario, Canada, is a tempered fluid supply that is about 85 F in summer and about 130 F in winter. In this operation, with a domestic hot water supply set for 120 F and an arrangement wherein the preheat tank is about 20% of the volume of the hot water tank, the temperature of the contents of the preheat tank 22 [T2 in FIGS. 2-5] will be maintained at about 80 F in summer and at about 100 F in winter.

Water Source Heat Pump System

In water source heat pump systems, the tempered fluid supply is available year round with a temperature T1 that ranges between about 105 F in summer and about 55 F in winter. In this application, an operating regime that has significant advantage in climates such as that in Southern Ontario, Canada, is a tempered fluid supply that is set at about 90 F in summer and about 60 F in winter. In this operation, with a domestic hot water supply set for 120 F and an arrangement wherein the preheat tank is 20% of the volume of the hot water tank, the temperature T2 of the contents of the preheat tank 22 will be maintained at about 80 F in summer and at about 55 F in winter.

Two Pipe Fan Coil System

In two pipe fan coil systems, the temperature T1 of the tempered fluid supply changes with the season: in the summer, tempered fluid is made available at about 40 F-60 F, for space cooling; in winter, the tempered fluid is made available at between 100 F and 180 F, for space heating. In this application, an operating regime that has significant advantage in climates such as that in Southern Ontario, Canada, is a tempered fluid supply that is set at about 45 F in summer and about 130 F in winter. In this operation, with a domestic hot water supply set for 120 F and an arrangement wherein the preheat tank is 20% of the volume of the hot water tank, the temperature T2 of the preheat tank 22 will be maintained at about 120 F in winter; the preheat tank 22 will be bypassed in summer entirely; and the refrigeration unit will be inactive in winter.

Four Pipe Fan Coil Systems

Figure 6:
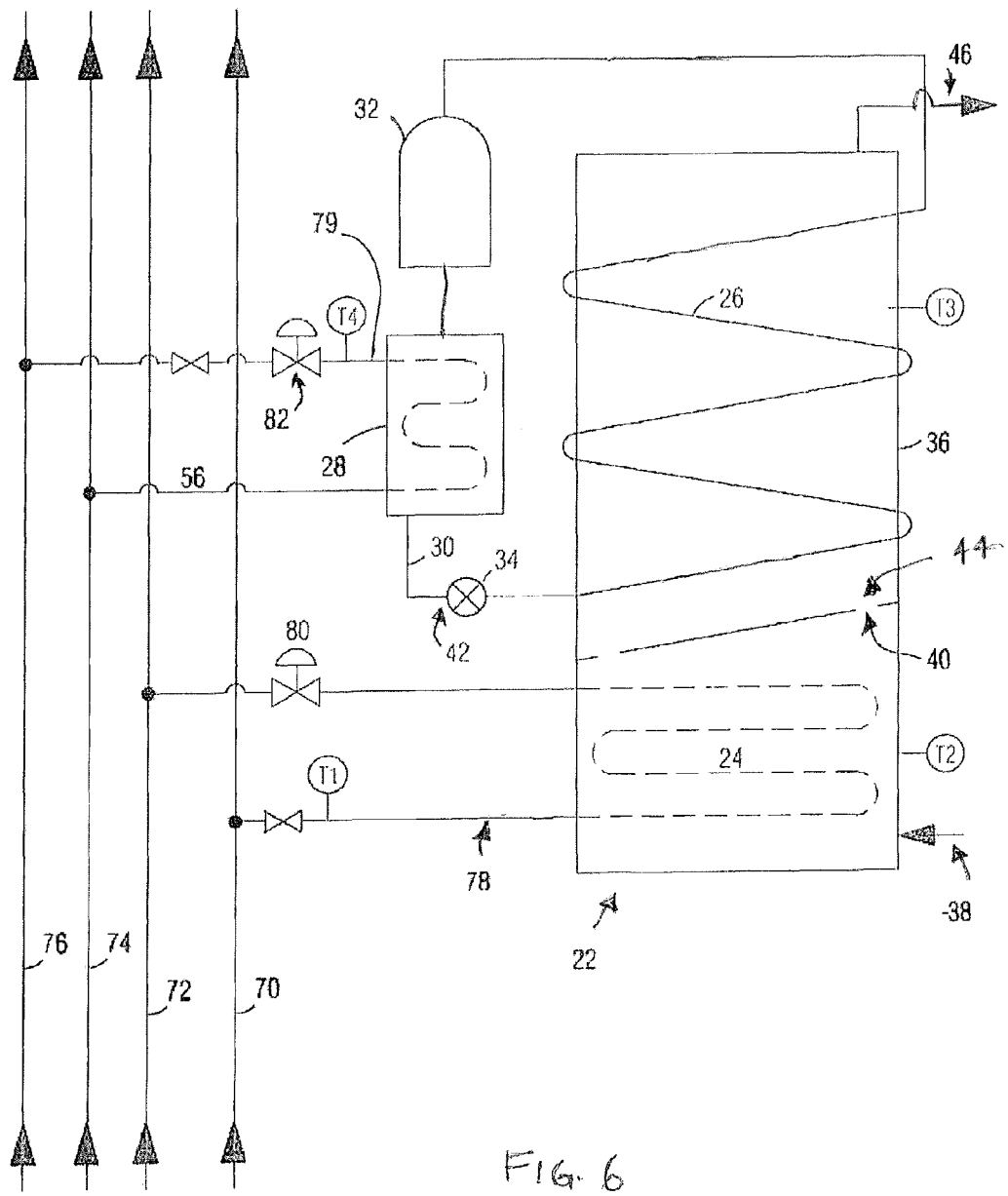
FIG. 6 shows a schematic view of an arrangement according to an exemplary embodiment of the invention in use with a four pipe fan coil HVAC system.

The arrangement can also be utilized in the context of 4-pipe fan coil systems including a chilled water supply, a hot water supply, a chilled water return and a hot water return. FIG. 6 shows an arrangement according to an exemplary embodiment of the invention and including the elements of FIG. 1 as used in a high-rise residential building having a tempered fluid system of this type; herein will be seen:
- the hot water supply 70 and return 72 and the chilled water supply 74 and return 76
- the preheat tank 22, heat exchanger 24, condenser 26, evaporator 28, refrigerant circuit 30 including refrigerant, compressor 32, expansion valve 34 and water storage tank 36, as previously described, the preheat tank 22 being coupled to a domestic water distribution subsystem (not shown) for receiving domestic water therefrom a first fluid circuit 78 in which the heat exchanger is interposed which couples the hot water supply 70 to the hot water return 72; a second fluid circuit 79 in which the evaporator 28 is interposed which couples the chilled water supply 74 to the chilled water return 76; a first control valve 80 interposed in the first fluid circuit 78; and a second control valve 82 interposed in the second fluid circuit 79, collectively defining a control mechanism having three operating modes.

First Operating Mode—Passive Reclaim

The first operating mode is defined by a position of the first control valve 80 that provides for flow through the heat exchanger, a position of the second control valve that arrest flow through the evaporator and an inactive vapor compression refrigeration arrangement. In the first operating mode, the tempered fluid is routed through the heat exchanger, to pass heat to the contents of the preheat tank.

Second Operating Mode—Active Reclaim

The second operating mode is defined by a position of the first control valve that arrests flow through the heat exchanger, a position of the second control valve that provides for flow through the evaporator and an active vapor compression refrigeration arrangement. In the second operating mode, the tempered fluid is routed through the evaporator and the refrigeration arrangement is active, such that heat is passed to the refrigerant.

Third Operating Mode

The third operating mode is defined by a position of the first control valve that arrests flow through the heat exchanger, a position of the second control valve that arrest flow through the evaporator and an inactive vapor compression refrigeration arrangement. In this mode, heat is passed neither to the heat exchanger nor the evaporator.

Use

In four pipe fan coil systems, two supplies of tempered fluid are typically available: a hot fluid, which ranges between 160 F in winter and 80 F in summer, and a chilled fluid, which ranges between 40 F and 60 F. In winter conditions, the chilled fluid circuit may be disabled.

In this application, an operating regime that has significant advantage in climates such as that in Southern Ontario, Canada, is a hot water supply maintained at about 130 F in winter and a chilled water supply maintained at about 45 F in summer.

In this operation, with a domestic hot water supply set for 120 F and an arrangement wherein the preheat tank is 20% of the volume of the hot water tank, the preheat tank 22 will be maintained at about 120 F in winter; the preheat tank 22 will be bypassed in summer entirely; and the refrigeration unit will be inactive in winter.

Benefits and Advantages

In many structures, there is excess available heat in the building systems that can be used to provide some or most of the heat required for warming domestic hot water passively.

If there is excess heat available in the building systems, but the temperature is too low to permit passive heat exchange to the domestic water tank, the heat can be extracted by the refrigeration arrangement at a COP of about 4. Importantly, this COP only applies to the water heated in the storage tank. For example, with a hybrid system with 90 F fluids, the overall COP would be about 8, with 50 F entering DW and 120 F supply DW temperature.

During periods when the building systems do not have an excess of heat and are being supplemented by high efficiency condensing boilers the bulk of the heat will come from natural gas with efficiencies far exceeding that of normal gas fired hot water heaters.

On buildings that would normally incorporate in-suite gas fired hot water tanks will eliminate the need for a gas distribution system and flue venting. This approach can save significant energy and cost [operating and capital]

On buildings that would normally have electric hot water tanks, the invention can save significant energy and costs.

Effectiveness Operating Examples

Prophetic examples are described below to further demonstrate the performance of the apparatus. The examples relate to the apparatus as applied in a hybrid heat pump system in a typical condominium installation. It will be understood that this is a representative application, only.

By way of background, the following assumptions are made:

a) The average consumption of domestic hot water in a high rise apartment/condominium is 40 US gallons per day. This information comes from the ASHRAE Applications Handbook.

b) Domestic cold water temperatures supplied through the ground piping systems average 50° F. in the Northern US and Southern Canada. Tank temperatures are normally maintained at 130° F.

c) Heat required to provide 40 gallons of 130° F. water per day is 40×8.33×(130°−50°)=26,600 BTU's. Tank heat loss is approximately 6,000 BTU for a total heat load of 32,000 BTU's/day d) Each and every building and each and every suite in a high rise residential is different, varying by location, occupancy, and construction. In the examples, in order to evaluate and provide a comparison of domestic water heating systems, the year has been broken down into 4 periods. These are summer [June, July & August in North America] where at all times the building will be rejecting heat through the HVAC system; winter [December, January & February] when there is no excess heat available from the HVAC system; and spring and fall, wherein it is assumed for the purpose of the examples that 50% of the heat will be available from the HVAC system.

e) While energy rates vary significantly by location, and in some cases by time of day, for simplicity, the examples reflect a rate of $0.12/kwh for electricity and $1.20/therm for natural gas at 100% efficiency.

Domestic water heating systems commonly in use for this type of building are as follows:
1) Individual Electric Water Heating Tanks
2) Individual Gas Fired Water Heating Tanks
3) Central Gas Fired System The following is the energy and cost calculations for each of these methods of domestic water heating.

| Individual Electric Water Heating Tanks | | |
|---|---|---|
| Installation | Tank Costs - Low | Electrical Wiring Costs - High |
| Calculations | 32,000 BTU/day = 9.4 kW/day<br>Electric Heating = 100% Efficiency<br>9.4 kW/day = 3,420 kW/year<br>At $.12/kW = $410/year | |
| Energy | Consumed<br>Recycled | 3,420 kW/yr<br>0 kW |

| Individual Gas Fired Water Heating Tanks | | |
|---|---|---|
| Installation- | Tank Cost - Low | Gas Piping Costs - Very High |
| Calculations | Gas Heaters are 80% Efficient | |
| | Gas Consumer/day 32,000/.8/10000 = | |
| | .4 Therms/day | |
| | Annual Gas Consumption/year = | |
| | .4 × 365 = 146 therms | |
| | Annual Gas Costs/Suite = | |
| | 146 × $1.20 = $175.20/year | |
| Energy | Consumed 146 therms = | 4278 kW |
| | Recycled | 0 kW |

| Centralized Domestic Hot Water Heating System (per suite basis) | |
|---|---|
| Installation | Boilers/Storage Tanks - Expensive |
| | Hot Water Piping Through Building - Expensive |
| Calculations | Gas Boilers are 80% Efficient |
| | Line Heat Losses 33% |
| | Gas Consumer/day 26,600/.8/(1 − .33)/10000 = |
| | 485 Therms/day |
| | Annual Gas Consumption/year = 485 × 365 = |
| | 177 therms/year |
| | Annual Gas Costs/Suite = 177 × $1.20 = $212.20/year |
| Energy | Consumed - 177 therms = 5186 kW |
| | Recycled 0 kW |

Exemplary Inventive Hybrid Heat Pump System

The following is the energy and cost calculation for the mentioned typical condominium installation of the exemplary apparatus and using the same assumptions as indicated above.

| Installation - | Tank Cost - Expensive | | | |
|---|---|---|---|---|
| | Piping Costs - Low | | | |
| | Electrical Costs - Medium | | | |
| Calculations - | Season | Summer | Winter | Spring/Fall |
| | Days | 121 | 121 | 243 |
| System Fluid Temperature | | 90° F. | 100° F. | 85° F. |
| PreHeat Tank Effectiveness | | 80% | 80% | 80% |
| Water Temp Rise 80% × (90° − 50°) = | | | | |
| | | 32° F. | 40° F. | 28° |
| Passive Heating 32°/70° × 32,000 = | | | | |
| | | 14,600 BTU | 18,300 | 12,800 |
| Source | | Recycled | 100% Gas | 50% Gas |
| Non Passive Heating | | 32,000 − 14,600 = | | |
| | | 17,400 BTU | 13,700 | 19,200 |
| Source | Recycled | 75% | 0% | 37% |
| | Gas | 0% | 75% | 37% |
| | Electric | 25% | 25% | 25% |
| Gas Used/Yr | (18,300 × 100% + 13,700 × | | @95% | |
| | 75%) × 121/100,000/95% | | Boiler Eff | |
| | | 0 | =36.4 therm | 34.6 therms |
| Electrical | | 17,400 × .25/3413 × 121= | | |
| | | 154 kW | 121 kW | 342 kW |
| Total Gas | 71 therms @ $1.20 = $85.20/Year | | | |
| Total Electric | 617 kW @ $.12/kWh = $74.00/Year | | | |
| Total Cost | $159.24/yr | | | |
| Energy Consumed | 2697 kWh | | | |
| Energy Recovered | 732 kWh | | | |

Comparisons

These comparisons show the annual operating cost savings and annual energy savings in both dollars and percentages provided by the Domestic Water Heat Recovery Unit [inventive hybrid heat pump] over other conventional systems

| | DWHRU | Electric Tank | Gas Tank | Gas Central |
|---|---|---|---|---|
| Annual Costs | $159.24 | $410.00 | $175.20 | $212.20 |
| Savings/yr | $ 0 | $250.76 | $ 15.96 | $ 52.96 |
| % Annual Cost Savings | | 61% | 9% | 25% |
| Energy Usage | 2697 kWh/yr | 3420 kWh/hr | 4278 kWh/yr | 5186 kWh/yr |
| Energy savings | | 732 kWh/yr | 1581 kWh/yr | 2489 kWh/yr |
| % Energy Savings | | 21% | 37% | 48% |

Variations and Modifications

Whereas various operating conditions and thermodynamic capacities are herein described in detail, it will be evident that modifications can be made, including but not limited to:

the volume of the preheat tank can vary and need not represent 20% of the volume of the hot water tank the recovery rate of the heat exchanger can vary the hot water tank set point need not be set at 120 F as indicated the material difference embodied in the controller for the purpose of oscillation avoidance can, for example only, be 2 F the material difference embodied in the controller for the purpose of prolonged cycling can, for example only, be 5 F the control mechanism can be embodied with other arrangements of valves and fluid circuits the operating conditions of the tempered fluid subsystem can be other than those specified Accordingly, the invention should be understood as limited only by the accompanying claims, purposively construed.

The invention claimed is:

1. A system for providing domestic water, heated domestic water and space heating and cooling to a plurality of spaces, the system comprising: a domestic water distribution subsystem for providing domestic water to said plurality of spaces; a tempered fluid distribution subsystem for tempering a fluid and providing same to said plurality of spaces; air handling units adapted to transfer heat between the fluid and the plurality of spaces to provide for said space heating and cooling; and a plurality of arrangements for providing heated domestic water, each arrangement including:

a preheat tank coupled to the domestic water distribution subsystem for receiving domestic water therefrom;

a heat exchanger coupled to the preheat tank in heat exchanging relation;

a condenser, an evaporator, a refrigerant circuit including refrigerant, a compressor and an expansion valve, all coupled together to define a vapour compression refrigeration arrangement wherein heat is accepted in the evaporator in use and rejected in the condenser in use;

a control mechanism coupled to the tempered fluid distribution subsystem, the heat exchanger and the refrigeration arrangement and having: (i) a first operating mode, wherein the fluid is routed through the heat exchanger, to pass heat to the contents of the preheat tank; and (ii) a second operating mode, wherein the fluid is routed through the evaporator and the refrigeration arrangement is active, to pass heat to the refrigerant; and a water storage tank coupled to the preheat tank to receive water therefrom and coupled to the condenser in heat exchanging relation such that heat rejected by the condenser is passed to the contents of the water storage tank.

2. A system according to claim 1, wherein the control mechanism has a third operating mode, wherein heat is passed neither to the heat exchanger nor the evaporator.

3. A system according to claim 2, wherein: the tempered fluid distribution subsystem has a supply and a return and the tempered fluid distribution subsystem is selected from hybrid heat pump system, water source heat pump system and two pipe fan coil system; and the control mechanism has a fourth operating mode, wherein the refrigeration arrangement is active and the fluid is routed through the heat exchanger and then through the evaporator to pass heat to the contents of the preheat tank and then to the refrigerant.

4. A system according to claim 3, wherein:
the fluid flows through the heat exchanger when the temperature of the fluid upstream of the heat exchanger is materially higher than the temperature of the preheat tank and the temperature of the preheat tank is materially below a set point temperature of the water storage tank;
the fluid does not flow through the heat exchanger when the temperature of the fluid upstream of the heat exchanger is below the temperature of the preheat tank;
the refrigeration arrangement is inactive when the temperature of the fluid upstream of the evaporator is below a minimum safe operating temperature of the tempered fluid distribution subsystem;
the refrigeration arrangement is inactive when the temperature of the water storage tank is materially above the set point temperature of the water storage tank; and
the refrigeration arrangement is active when the temperature of the water storage tank is materially below the set point temperature of the water storage tank; the temperature of the fluid upstream and downstream of the evaporator is materially above the minimum safe operating temperature of the tempered fluid distribution subsystem; the temperature of the water storage tank is falling; and the temperature of the preheat tank is falling.

5. A system according to claim 4, wherein:
the refrigeration arrangement is inactive when the temperature of the preheat tank is increasing and the temperature of the fluid downstream of the heat exchanger is materially above the set point temperature of the water storage tank; and
the refrigeration arrangement is active when the temperature of the water storage tank is materially below the set point temperature of the water storage tank, the temperature of the fluid upstream and downstream of the evaporator is materially above the minimum safe operating temperature of the tempered fluid distribution subsystem, the temperature of the preheat tank is stable and the temperature in the water storage tank is falling.

6. A system according to claim 5, wherein the tempered fluid distribution subsystem is a hybrid heat pump system and wherein the fluid that is provided to each of the plurality of spaces is at a temperature that ranges between 75 F in summer and 130 F in winter.

7. A system according to claim 6, wherein the fluid that is provided to each of the plurality of spaces is at a temperature that ranges between about 85 F in summer and about 120 F in winter.

8. A system according to claim 5, wherein the tempered fluid distribution subsystem is a water source heat pump and wherein the fluid that is provided to each of the plurality of spaces is at a temperature that ranges between 105 F in summer and 55 F in winter.

9. A system according to claim 8, wherein the fluid that is provided to each of the plurality of spaces is at a temperature that ranges between about 90 F in summer and about 60 F in winter.

10. A system according to claim 5, wherein the tempered fluid distribution subsystem is a two pipe fan coil system; and wherein in summer, the fluid that is provided to each of the plurality of spaces is at a temperature between 40 F and 60 F; and wherein in winter, the fluid that is provided to each of the plurality of spaces is at a temperature between 100 F and 180 F.

11. A system according to claim 10, wherein, in summer, the fluid that is provided to each of the plurality of spaces is at a temperature of about 45 F; and wherein in winter, the fluid that is provided to each of the plurality of spaces is at a temperature of about 130 F.

12. A system according to claim 5, wherein
the control mechanism is defined by: a fluid circuit coupling the tempered fluid distribution subsystem supply to the tempered fluid distribution subsystem return and in which the evaporator is interposed; a control valve interposed in the fluid circuit upstream of the evaporator; a three way valve interposed in the fluid circuit upstream of the control valve; and a shunt fluid circuit providing a parallel path from the tempered fluid distribution subsystem supply to the three way valve and in which the heat exchanger is interposed;
the first operating mode is defined by a position of the three way valve that provides for flow through the heat exchanger, a position of the control valve that provides for flow through the evaporator and an inactive vapour compression refrigeration arrangement;
the second operating mode is defined by a position of the three way valve that provides for flow which bypasses the heat exchanger, a position of the control valve that provides for flow through the evaporator and an active vapour compression refrigeration arrangement;
the third operating mode is defined by a position of the control valve that arrests flow and an inactive vapour compression refrigeration arrangement; and
the fourth operating mode is defined by a position of the three way valve that provides for flow through the heat exchanger, a position of the control valve that provides for flow through the evaporator and an active vapour compression refrigeration arrangement.

13. A system according to claim 2, wherein:
the tempered fluid distribution subsystem is a four pipe fan coil system including a chilled water supply, a hot water supply, a chilled water return and a hot water return;
the tempered fluid distribution subsystem provides to each of the plurality of spaces: (i) hot water, at a temperature that ranges from 160 F in winter to 80 F in summer; and (ii) at least in summer, chilled water, at a temperature in the range of 40-60 F; and
the control mechanism is coupled to the tempered fluid distribution subsystem, the heat exchanger and the refrigeration arrangement such that, in the first operating mode, the hot water is routed through the heat exchanger, to pass heat to the contents of the preheat tank; and in the second operating mode, the chilled water is routed through the evaporator and the refrigeration arrangement is active, to pass heat to the refrigerant.

14. A system according to claim 13, wherein:
the hot water flows through the heat exchanger when the temperature of the hot water upstream of the heat exchanger is materially higher than the temperature of the preheat tank and the temperature of the preheat tank is materially below a set point temperature of the water storage tank;
the hot water does not flow through the heat exchanger when the temperature of the hot water upstream of the heat exchanger is below the temperature of the preheat tank;
the refrigeration arrangement is inactive when the temperature of the water storage tank is materially above the set point temperature of the water storage tank;
the refrigeration arrangement is active when the temperature of the water storage tank is materially below the set point temperature of the water storage tank, the temperature of the water storage tank is falling and the temperature of the preheat tank is falling;
the refrigeration arrangement is inactive when the temperature of the preheat tank is increasing and the temperature of the hot water downstream of the heat exchanger is materially above the set point temperature of the water storage tank; and
the refrigeration arrangement is active when the temperature of the water storage tank is materially below the set point temperature of the water storage tank, the temperature of the preheat tank is stable and the temperature in the water storage tank is falling.

15. A system according to claim 14, wherein
the control mechanism is defined by: (i) a first fluid circuit in which the heat exchanger is interposed which couples the hot water supply to the hot water return; (ii) a second fluid circuit in which the evaporator is interposed which couples the chilled water supply to the chilled water return; (iii) a first control valve interposed in the first fluid circuit; and (iv) a second control valve interposed in the second fluid circuit;
the first operating mode is defined by a position of the first control valve that provides for flow through the heat exchanger, a position of the second control valve that arrest flow through the evaporator and an inactive vapor compression refrigeration arrangement;
the second operating mode is defined by a position of the first control valve that arrests flow through the heat exchanger, a position of the second control valve that provides for flow through the evaporator and an active vapor compression refrigeration arrangement; and
the third operating mode is defined by a position of the first control valve that arrests flow through the heat exchanger, a position of the second control valve that arrest flow through the evaporator and an inactive vapor compression refrigeration arrangement.

16. A system according to claim 13, wherein: the tempered fluid distribution subsystem provides to each of the plurality of spaces: (i) hot water, at a temperature that ranges from 130 F in winter to 120 F in summer; and (ii) at least in summer, chilled water, at a temperature of about 45 F.

17. A water heater arrangement for use with a domestic water distribution subsystem and a
tempered fluid distribution subsystem, the tempered fluid distribution subsystem being of the type adapted to temper a fluid and provide same to a plurality of spaces, having a supply and a return and being selected from hybrid heat pump system, water source heat pump system and two pipe fan coil system, the arrangement comprising:
a preheat tank coupled to the domestic water distribution subsystem for receiving water therefrom;
a heat exchanger coupled to the preheat tank in heat exchanging relation;
a condenser, an evaporator, a refrigerant circuit including refrigerant, a compressor and an expansion valve, all coupled together to define a vapour compression refrigeration arrangement wherein heat is accepted in the evaporator in use and rejected in the condenser in use;
a control mechanism coupled to the tempered fluid distribution subsystem, the heat exchanger and the refrigeration arrangement and having: (i) a first operating mode, wherein the fluid is routed through the heat exchanger, to pass heat to the contents of the preheat tank; (ii) a second operating mode, wherein the fluid is routed through the evaporator and the refrigeration arrangement is active, to pass heat to the refrigerant; (iii) a third operating mode, wherein heat from the fluid is passed neither through the heat exchanger nor the evaporator; and (iv) a fourth operating mode, wherein the fluid is routed through the heat exchanger and then through the evaporator to pass heat to the contents of the preheat tank and then to the refrigerant; and
a water storage tank coupled to the preheat tank to receive water therefrom and coupled to the condenser in heat exchanging relation such that heat rejected by the condenser is passed to the contents of the water storage tank.

18. An arrangement according to claim 17, wherein
the control mechanism is defined by: (i) a fluid circuit coupling the tempered fluid distribution subsystem supply to the tempered fluid distribution subsystem return and in which the evaporator is interposed; (ii) a control valve interposed in the fluid circuit upstream of the evaporator; (iii) a three way valve interposed in the fluid circuit upstream of the control valve; and (iv) a shunt fluid circuit providing a parallel path from the tempered fluid distribution subsystem supply to the three way valve and in which the heat exchanger is interposed; and
the first operating mode is defined by a position of the three way valve that provides for flow through the heat exchanger, a position of the control valve that provides for flow through the evaporator and an inactive vapor compression refrigeration arrangement;
the second operating mode is defined by a position of the three way valve that provides for flow which bypasses the heat exchanger, a position of the control valve that provides for flow through the evaporator and an active vapor compression refrigeration arrangement;
the third operating mode is defined by a position of the control valve that arrests flow and an inactive vapor compression refrigeration arrangement; and
the fourth operating mode is defined by a position of the three way valve that provides for flow through the heat exchanger, a position of the control valve that provides for flow through the evaporator and an active vapor compression refrigeration arrangement.

19. A water heater arrangement for use with a domestic water distribution subsystem and with a
tempered fluid distribution subsystem, the tempered fluid distribution subsystem being a four pipe fan coil system including a chilled water supply, a hot water supply, a chilled water return and a hot water return, the arrangement comprising:
a preheat tank coupled to the domestic water distribution subsystem for receiving water therefrom;
a heat exchanger coupled to the preheat tank in heat exchanging relation;
a condenser, an evaporator, a refrigerant circuit including refrigerant, a compressor and an expansion valve, all coupled together to define a vapour compression refrigeration arrangement wherein heat is accepted in the evaporator and rejected in the condenser;
a control mechanism coupled to the tempered fluid distribution subsystem, the heat exchanger and the refrigeration arrangement and having: (i) a first operating mode, wherein the hot water supply is routed through the heat exchanger, to pass heat to the contents of the preheat tank; and (ii) a second operating mode, wherein the chilled water supply is routed through the evaporator and the refrigeration arrangement is active, to pass heat to the refrigerant; and
a water storage tank coupled to the preheat tank to receive water therefrom and coupled to the condenser in heat exchanging relation such that heat rejected by the condenser is passed to the contents of the water storage tank.

20. An arrangement according to claim 19, wherein
the control mechanism also has a third operating mode, wherein the hot water supply bypasses the heat exchanger and the chilled water supply bypasses the evaporator; and the control mechanism is defined by:
a first fluid circuit in which the heat exchanger is interposed which couples the hot water supply to the hot water return;
a second fluid circuit in which the evaporator is interposed which couples the chilled water supply to the chilled water return;
a first control valve interposed in the first fluid circuit; and
a second control valve interposed in the second fluid circuit, and wherein:

the first operating mode is defined by a position of the first control valve that provides for flow through the heat exchanger, a position of the second control valve that arrest flow through the evaporator and an inactive vapor compression refrigeration arrangement;

the second operating mode is defined by a position of the first control valve that arrests flow through the heat exchanger, a position of the second control valve that provides for flow through the evaporator and an active vapor compression refrigeration arrangement; and the third operating mode is defined by a position of the first control valve that arrests flow through the heat exchanger, a position of the second control valve that arrest flow through the evaporator and an inactive vapor compression refrigeration arrangement.

* * * * *